(12) United States Patent
Ueno (10) Patent No.: US 7,703,276 B2
(45) Date of Patent: Apr. 27, 2010

(54) EXHAUST GAS PURIFYING APPARATUS FOR ENGINE

(75) Inventor: Hiroki Ueno, Ageo (JP)

(73) Assignee: Nissan Diesel Motor Co., Ltd., Ageo-shi, Saitama-ken (JP)

( * ) Notice: Subject to any disclaimer, the term of this patent is extended or adjusted under 35 U.S.C. 154(b) by 826 days.

(21) Appl. No.: 10/574,341

(22) PCT Filed: Sep. 13, 2004

(86) PCT No.: PCT/JP2004/013305

§ 371 (c)(1),
(2), (4) Date: Nov. 22, 2006

(87) PCT Pub. No.: WO2005/033482

PCT Pub. Date: Apr. 14, 2005

(65) Prior Publication Data

US 2007/0163232 A1 Jul. 19, 2007

(30) Foreign Application Priority Data

Oct. 2, 2003 (JP) ............................. 2003-344757
Oct. 2, 2003 (JP) ............................. 2003-344758

(51) Int. Cl.
*F01N 3/00* (2006.01)

(52) U.S. Cl. ............................. 60/286; 60/289; 60/293; 60/295; 60/298; 60/303; 239/132; 239/132.3

(58) Field of Classification Search .................. 60/274, 60/286, 289, 293, 295, 298, 299, 301, 303, 60/307; 239/132, 132.3, 585.1, 585.5
See application file for complete search history.

(56) References Cited

U.S. PATENT DOCUMENTS

| 5,431,893 | A |   | 7/1995  | Hug et al. |         |
|-----------|---|---|---------|------------|---------|
| 5,605,042 | A | * | 2/1997  | Stutzenberger | 60/286 |
| 6,167,698 | B1| * | 1/2001  | King et al. | 60/286 |
| 6,192,677 | B1| * | 2/2001  | Tost        | 60/286 |
| 6,301,879 | B1| * | 10/2001 | Weisweiler et al. | 60/274 |
| 6,526,746 | B1| * | 3/2003  | Wu          | 60/286 |
| 6,539,708 | B1| * | 4/2003  | Hofmann et al. | 60/286 |

FOREIGN PATENT DOCUMENTS

| EP | 1 331 373 A2  | 7/2003  |
|----|---------------|---------|
| JP | 2000-027627   | 1/2000  |
| JP | 2003-222019   | 8/2003  |
| JP | 2003-269141   | 9/2003  |
| JP | 2003-269145   | 9/2003  |
| WO | WO 98/43732   | 10/1998 |

OTHER PUBLICATIONS

International Preliminary Report and Written Opinion; and an English-language translation of the International Preliminary Report and Written Opinion.

\* cited by examiner

*Primary Examiner*—Binh Q. Tran
(74) *Attorney, Agent, or Firm*—McDermott Will & Emery LLP (57) ABSTRACT

Clogging of an injection nozzle which supplies a reducing agent to the exhaust gas on an upstream side of a reduction catalyst in the exhaust gas passage is prevented, and the efficiency of NOx purification processing is improved. A reducing agent supply unit uses a detection signal of the exhaust gas temperature from a temperature detection device to set a supply quantity at or above a lower limit for cooling the interior of an injection nozzle to below the temperature at which urea water crystallizes, for the detected exhaust gas temperature, and supplies urea water to the injection nozzle at the set supply quantity. By such supply of urea water, the interior of the injection nozzle is cooled to below the temperature at which the urea water crystallizes. As a result, the urea water does not crystallize inside the injection nozzle, and clogging of the injection nozzle can be prevented.

9 Claims, 4 Drawing Sheets

EXHAUST GAS PURIFYING APPARATUS FOR ENGINE

This application is a continuation of PCT/JP2004/013305, filed on Sep. 13, 2004.

BACKGROUND OF THE INVENTION

1. Field of the Invention

The present invention relates to an exhaust gas purifying apparatus for an engine, which uses a reducing agent to remove, by reduction, nitrogen oxide (NOx) discharged from a diesel engine, a gasoline engine, or the like, mounted on a mobile vehicle. In particular, it relates to an engine exhaust gas purifying apparatus that prevents clogging of an injection nozzle for supplying a reducing agent to an exhaust gas on an upstream side of a reducing catalyst, and when clogging in the injection nozzle occurs, clears such clogging, to improve the efficiency of NOx purification processing.

2. Description of the Related Art

As a system which purifies exhaust gas by removing particularly NOx from among particulate matters (PM) in exhaust gas discharged from an engine, several exhaust gas purifying apparatuses have been proposed. In these exhaust gas purifying apparatuses, a reduction catalyst is placed in the exhaust system of the engine, and a reducing agent is injection-supplied into an exhaust gas passage on the upstream side of the reduction catalyst, to thereby catalytically reduction react the NOx in the exhaust gas with the reducing agent, and thus purification process the NOx into harmless constituents. The reducing agent is stored in a liquid state at room temperature in a reservoir tank, and a necessary amount thereof is injection-supplied from an injection nozzle. The reduction reaction uses ammonia which has excellent reactivity with NOx, and a reducing agent water solution such as a urea aqueous solution, ammonia aqueous solution or the like that is hydrolyzed to produce ammonia easily is used as the reducing agent (refer for example to Japanese Unexamined Patent Publication No. 2000-27627).

However, in the aforementioned conventional exhaust gas purifying apparatus, an amount of reducing agent supplied is controlled in accordance with the operation state of the engine (exhaust gas temperature, NOx discharge quantity, and so forth). However in some cases, depending on the operation state of the engine, the injection holes of the injection nozzle provided in the exhaust gas passage, or the passage leading thereto, may become clogged and it may become impossible to supply reducing agent sufficiently. As a result, the reduction reaction of the NOx with the above-mentioned reduction catalyst does not proceed smoothly, and there is a possibility of NOx being exhausted.

The above clogging of the injection nozzle is principally caused by the urea (referred to below as "solid urea") in the urea aqueous solution (referred to below as "urea water") serving as the reducing agent, crystallizing and solidifying in the injection holes, or the passage leading thereto. This is because urea water solidifies at 100° C., and hence when the urea water is heated above 100° C. urea crystals form. Here, during the normal injection supply of urea water by the injection nozzle, the urea water supplied from the reservoir tank, (urea water and compressed air in the case of a reducing agent supply system that supplies compressed air with urea water to the injection nozzle), cools the interior of the nozzle, so that even if the injection nozzle is heated by the exhaust gas from the engine, the urea water does not reach 100° C. However, in the case where the quantity of urea water supplied is reduced, so that the interior of the nozzle can no longer be cooled, there is a possibility that the urea water inside the nozzle could reach or exceed 100° C., and urea crystals could form, causing clogging.

Moreover the melting point of solid urea is 132° C. Therefore if the exhaust gas temperature close to the injection nozzle is raised by the exhaust gas from the engine, and the heat input to the injection nozzle is increased, the solid urea will melt and the clogging of the nozzle will be cleared.

However, in the case where a reduction agent supply means is a so-called air assisted type reduction agent supply means that supplies compressed air together with urea water to the injection nozzle to atomize the urea water and eject it, the compressed air that is constantly supplied to the injection nozzle cools the interior of the nozzle. Therefore, the temperature of the interior of the nozzle does not rise above 132° C., and melting of the solid urea is prevented. Consequently there is a possibility that solid urea that has crystallized and solidified will attached to the interior of the injection nozzle, and cause clogging of the nozzle. In this case, in order to raise the temperature of the interior of the injection nozzle to melt the sold urea, it is considered that the exhaust gas temperature inside the exhaust gas passage rises. However this may not be advisable for some engines.

SUMMARY OF THE INVENTION

Therefore, the present invention addresses such problems with an object of providing an engine exhaust gas purifying apparatus which prevents clogging of an injection nozzle which supplies a reducing agent to the exhaust gas on an upstream side of a reduction catalyst, and when clogging of the injection nozzle occurs, clears such clogging, to improve the efficiency of NOx purification processing.

An exhaust gas purifying apparatus as claimed in claim 1, is an exhaust gas purifying apparatus of an engine including: a reduction catalyst which is arranged in an exhaust system of an engine, for reducing and purifying nitrogen oxide in an exhaust gas using a reducing agent; a reducing agent supply means having an injection nozzle which is supplied with a reducing agent together with compressed air and atomizes the reducing agent, and which injection-supplies this to an exhaust gas on an upstream side of the reduction catalyst inside an exhaust gas passage of the exhaust system; and a temperature detection means which is provided in a position in the vicinity of the injection nozzle on the upstream side in the exhaust gas passage, and which detects the exhaust gas temperature inside the exhaust gas passage; wherein the reducing agent supply means uses a detection signal of the exhaust gas temperature from the temperature detection means to set a supply quantity at or above a lower limit for cooling the interior of the injection nozzle to below the temperature at which the reducing agent crystallizes, for that exhaust gas temperature, and carries out supply of reducing agent to the injection nozzle.

According to this construction, using the detection signal of the exhaust gas temperature from the temperature detection means, the reducing agent supply means sets the supply quantity at or above a lower limit for cooling the interior of the injection nozzle to below the temperature at which the reducing agent crystallizes, for the detected exhaust gas temperature, and supplies reducing agent to the injection nozzle at that set supply quantity. By such supply of reducing agent, the interior of the injection nozzle is cooled to below the temperature at which the reducing agent crystallizes.

The invention recited in claim 2 is characterized in that, the reducing agent supply means is provided with a control circuit which receives, as an input, a detection signal of the exhaust gas temperature from the temperature detection means, and also receives, as an input, a signal of the operation state of the engine, and which obtains a supply quantity of reducing agent in that engine operation state, and obtains a lower limit of a supply quantity of reducing agent for cooling the interior of the injection nozzle to below the temperature at which the reducing agent crystallizes, for that exhaust gas temperature, and compares both of these to set the supply quantity of the reducing agent. As a result, the control circuit provided in the reducing agent supply means receives, as an input, a detection signal of the exhaust gas temperature from the temperature detection means, and receives, as an input, a signal of the operation state of the engine, and obtains the supply quantity of reducing agent at the time of that engine operation state, and obtains a lower limit of a supply quantity of the reducing agent for cooling the interior of the injection nozzle to below the temperature at which the reducing agent crystallizes, for the detected exhaust gas temperature, and compares both of these to set the supply quantity of the reducing agent.

In the invention recited in claim 3, the reducing agent is a urea aqueous solution. As a result, a urea aqueous solution that can be hydrolyzed to readily produce ammonia is used as the reducing agent, and nitrogen oxide in the exhaust gas is reduced and purified.

Moreover, the exhaust gas purifying apparatus recited in claim 4, is an exhaust gas purifying apparatus of an engine including: a reduction catalyst which is arranged in an exhaust system of an engine, for reducing and purifying nitrogen oxide in an exhaust gas using a reducing agent; reducing agent supply means having an injection nozzle which is supplied with a reducing agent together with compressed air and atomizes the reducing agent, and which injection-supplies this to an exhaust gas on an upstream side of the reduction catalyst inside an exhaust gas passage of the exhaust system; and temperature detection means which is provided in a position in the vicinity of the injection nozzle on the upstream side in the exhaust gas passage, and which detects the exhaust gas temperature inside the exhaust gas passage; wherein the reducing agent supply means is provided with pressure detection means for detecting the internal pressure of the injection nozzle, and uses a detection signal of the internal pressure of the injection nozzle to stop supply of compressed air and reducing agent to the injection nozzle when this pressure reaches or exceeds a predetermined value, and uses a detection signal of the exhaust gas temperature from the temperature detection means to restart supply of compressed air and reducing agent to the injection nozzle when the exhaust gas temperature in the vicinity of the injection nozzle reaches or exceeds the melting point of the reducing agent.

According to such a construction, the reducing agent supply means uses a detection signal of the internal pressure of the injection nozzle detected by the pressure detection means to stop supply of compressed air and reducing agent to the injection nozzle when the detected pressure reaches or exceeds a predetermined value, and uses a detection signal of the exhaust gas temperature from the temperature detection means to restart supply of compressed air and reducing agent to the injection nozzle when the exhaust gas temperature in the vicinity of the injection nozzle reaches or exceeds the melting point of the reducing agent. As a result, cooling of the nozzle interior is suppressed, and clogging of the injection nozzle is cleared by the exhaust gas temperature inside the exhaust gas passage.

In the invention as recited in claim 5, the reducing agent supply means is provided with a control circuit which receives, as an input, a detection signal of internal pressure of the injection nozzle from the pressure detection means, and also receives, as an input, a detection signal of the exhaust gas temperature from the temperature detection means, and controls so as to stop the supply of compressed air and reducing agent to the injection nozzle when the internal pressure of the injection nozzle reaches or exceeds a predetermined value, and restart supply of compressed air and reducing agent to the injection nozzle when the exhaust gas temperature in the vicinity of the injection nozzle reaches or exceeds the melting point of the reducing agent. As a result, the control circuit provided in the reducing agent supply means receives, as an input, a detection signal of internal pressure of the injection nozzle from the pressure detection means, and receives, an input, a detection signal of the exhaust gas temperature from the temperature detection means, and controls so as to stop the supply of compressed air and reducing agent to the injection nozzle when the internal pressure of the injection nozzle reaches or exceeds a predetermined value, and restart the supply of compressed air and reducing agent to the injection nozzle when the exhaust gas temperature in the vicinity of the injection nozzle reaches or exceeds the melting point of the reducing agent.

In the invention as recited in claim 6, the reducing agent is a urea aqueous solution. As a result, a urea aqueous solution that can be hydrolyzed to readily produce ammonia is used as the reducing agent, and nitrogen oxide in the exhaust gas is reduced to be purified.

In the invention recited in claim 7, the exhaust gas temperature in the vicinity of the injection nozzle at the time when the supply of compressed air and reducing agent to the injection nozzle is restarted is 132° C. or thereabove. As a result, the interior of the injection nozzle is heated to a temperature at or higher than the melting point of the urea in the urea aqueous solution.

According to the invention according to claim 1, by supplying the reducing agent at a supply quantity set to greater than or equal to the lower limit for cooling the interior of the injection nozzle to below the temperature at which the reducing agent crystallizes, for the detected exhaust gas temperature, the interior of the injection nozzle is cooled, and the reducing agent does not crystallize, and clogging of the injection nozzle can be prevented. Consequently, the efficiency of the NOx purification processing can be improved.

Furthermore, according to the invention according to claim 2, the reducing agent can be supplied by comparing the supply quantity of the reducing agent in the engine operation state at that time, with the lower limit of the supply quantity of the reducing agent for cooling the interior of the injection nozzle to below the temperature at which the reducing agent crystallizes, for the detected exhaust gas temperature, and continually setting the supply quantity of the reducing agent for the exhaust gas temperature at that time, to at or above the lower limit. Consequently, the interior of the injection nozzle is cooled, and the reducing agent does not crystallize, and clogging of the injection nozzle can be prevented.

Moreover, according to the invention according to claim 3, by not directly using ammonia for the reducing agent, but using a urea aqueous solution which is hydrolyzed to easily produce ammonia, the NOx in the exhaust gas is converted into harmless constituents, and the efficiency of the NOx purification processing can be improved.

According to the invention according to claim 4, in the case where it is judged that clogging of the injection nozzle has occurred, the supply of compressed air and reducing agent to the injection nozzle can be stopped to suppress cooling of the nozzle interior, and in the case where in this state it is judged that the reducing agent in the interior of the nozzle has been melted by heat from the exhaust gas in the exhaust gas passage, the supply of compressed air and reducing agent to the injection nozzle can be restarted. As a result, when clogging of the injection nozzle has occurred, the clogging can be cleared even if the exhaust gas temperature in the exhaust gas passage is low. Consequently, the efficiency of the NOx purification processing can be improved.

Moreover, according to the invention recited in claim 5, the control circuit provided in the reducing agent supply means can judge that clogging of the injection nozzle has occurred when the internal pressure in the injection nozzle reaches or exceeds a predetermined value, and stop the supply of compressed air and reducing agent to the injection nozzle, and when the exhaust gas temperature in the vicinity of the injection nozzle reaches or exceeds the melting point of the reducing agent, can judge that the reducing agent in the interior of the injection nozzle has been melted by the heat from the exhaust gas, and restart the supply of compressed air and reducing agent to the injection nozzle. As a result, when clogging of the injection nozzle has occurred, the clogging can be cleared even in the case where the exhaust gas temperature in the exhaust gas passage is low, and accordingly, the efficiency of the NOx purification processing can be improved.

Moreover, according to the invention as recited in claim 6, by not directly using ammonia for the reducing agent, but using a urea aqueous solution which is hydrolyzed to easily produce ammonia, the NOx in the exhaust gas is converted into harmless constituents, and the efficiency of the NOx purification processing can be improved.

Still furthermore, according to the invention recited in claim 7, the exhaust gas from the engine can be used to heat the interior of the injection nozzle to the melting point of urea or thereabove, and solid urea inside the nozzle can be melted to clear the clogging of the injection nozzle. As a result, the efficiency of the NOx purification processing can be improved.

DESCRIPTION OF THE PREFERRED EMBODIMENTS

Figure 1:
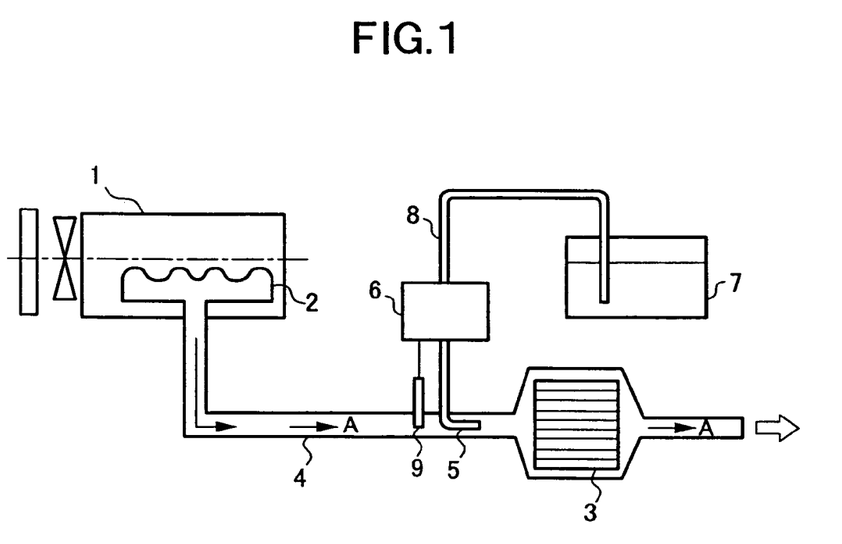
FIG. 1 is a conceptual diagram showing an embodiment of an engine exhaust gas purifying apparatus according to the present invention.

Hereunder is a detailed description of embodiments of the present inventions, based on the accompanying drawings. FIG. 1 is a diagram showing an embodiment of an engine exhaust gas purifying apparatus according to the present invention. This exhaust gas uses a reducing agent to remove, by reduction, NOx discharged from a diesel engine, a gasoline engine, or the like, mounted on a mobile vehicle. Exhaust gas of an engine 1, which uses gasoline or light oil as a fuel, is discharged from an exhaust gas manifold 2 into the atmosphere via an exhaust pipe 4 in which a NOx reduction catalyst 3 is arranged. More specifically, an exhaust system is of a construction in which three catalysts, namely a nitrogen monoxide (NO) oxidation catalyst, a NOx reduction catalyst, and an ammonia oxidation catalyst, are arranged in this order from the upstream side of the exhaust gas flow in the exhaust pipe 4 serving as an exhaust gas passage, and a temperature sensor, a NOx sensor, and so forth, are arranged before and after the catalysts. However, the detailed construction is not shown in the diagram.

The NOx reduction catalyst 3 is for reducing and purifying NOx in the exhaust gas passing through the exhaust pipe 4, using a reducing agent, and has for example a zeolite system active ingredient supported on a monolithic type catalyst carrier having a honeycomb shaped cross-section made from a ceramic cordilite, or a Fe—Cr—Al system heat-resistant steel. Moreover, the active ingredient supported on the catalyst carrier receives a supply of a reducing agent and is activated, and thereby effectively purifies the NOx into a harmless substance.

An injection nozzle 5 is arranged on the upstream side of the NOx reduction catalyst 3 in the passage of the exhaust gas and in the interior of the exhaust pipe 4. This injection nozzle 5 supplies a reducing agent to the exhaust gas on the upstream side of the NOx reduction catalyst 3. The reducing agent is supplied together with compressed air via a reducing agent supply unit 6, so that the reducing agent is atomized and injection-supplied. Such a device is usually called an air assisted type. Here, the injection nozzle 5 is arranged facing downstream substantially in parallel with the flow direction A of the exhaust gas in the exhaust pipe 4, or it is arranged to be inclined diagonally at an appropriate angle. Moreover, the reducing agent, which is stored in a reservoir tank 7, is supplied to the reducing agent supply unit 6 through a supply pipe 8. Also, the injection nozzle 5 and the reducing agent supply unit 6 constitute a reducing agent supply unit capable of supplying the reducing agent to the exhaust gas on the upstream side of the NOx reduction catalyst 3.

In this embodiment, a urea aqueous solution (urea water) is used as the reducing agent to be injection-supplied by the injection nozzle 5. Alternatively, an ammonia aqueous solution may be used. Moreover, the urea water injection-supplied by the injection nozzle 5 is hydrolyzed by the exhaust heat in the exhaust pipe 4 and readily produces ammonia. The obtained ammonia reacts with NOx in the exhaust gas in the NOx reduction catalyst 3 and purifies the NOx into water and harmless gas. The urea water is a water solution of a solid or powdered urea, and is stored in the reservoir tank 7. It is supplied to the reducing agent supply unit 6 through the supply pipe 8.

An exhaust gas temperature sensor 9 is arranged in the vicinity of the injection nozzle 5 on the exhaust gas upstream side, inside the exhaust pipe 4. This exhaust gas temperature sensor 9 constitutes a temperature detection unit for detecting the exhaust gas temperature inside the exhaust pipe 4, and in this embodiment it detects the exhaust gas temperature in the vicinity of the injection nozzle 5 on the upstream side in the exhaust gas flow. Moreover, a detection signal of the exhaust gas temperature detected by the exhaust gas temperature sensor 9 is transmitted to the reducing agent supply unit 6.

Figure 2:
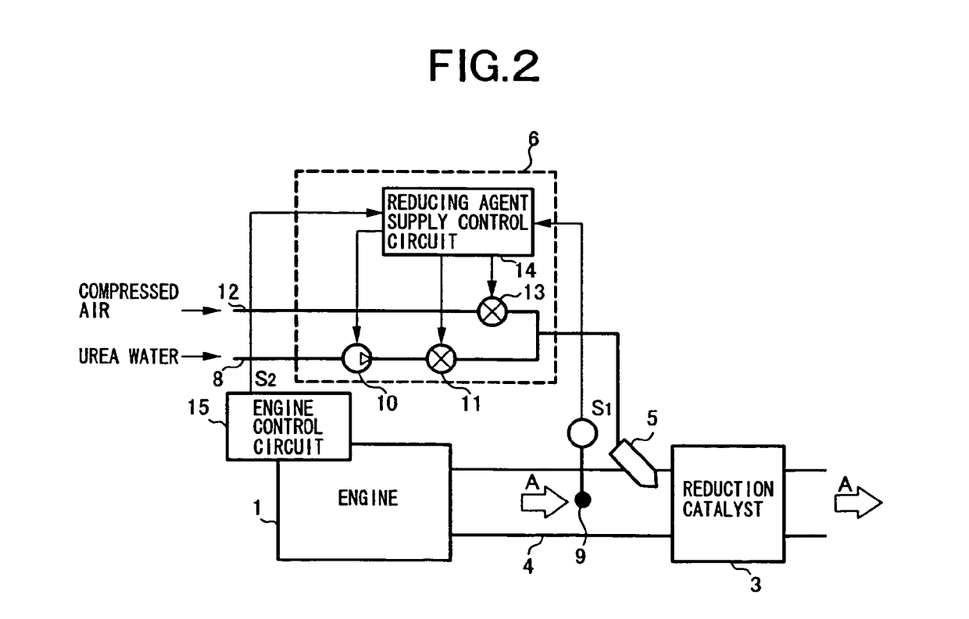
FIG. 2 is a schematic diagram for describing the construction and operation of a reducing agent supply unit and an injection nozzle of an exhaust gas purifying apparatus according to a first embodiment.

FIG. 2 is a schematic diagram for describing the construction and operation of the reducing agent supply unit 6 and the injection nozzle 5 according to a first embodiment of the present invention. This reducing agent supply unit 6 is configured to use a detection signal of the exhaust gas temperature from the exhaust gas temperature sensor 9 to set the supply quantity at or above a lower limit for cooling the interior of the injection nozzle 5 to below the temperature at which urea water crystallizes, for that exhaust gas temperature, and supplies urea water to the injection nozzle 5. That is to say, as shown in FIG. 2, it comprises: a booster pump 10 for raising the pressure of the urea water, arranged part way along a supply pipe 8 leading from the reservoir tank 7 shown in FIG. 1; a supply valve 11 that opens and closes the urea water passage, arranged on the downstream side of the booster pump 10; an air supply valve 13 that opens and closes a compressed air passage, arranged part way along an air supply pipe 12 leading from a compressed air source (not shown in the diagram); and a reducing agent supply control circuit 14.

Moreover, the reducing agent supply control circuit 14 receives a detection signal $S_1$ of the exhaust gas temperature from the exhaust gas temperature sensor 9, and receives a signal $S_2$ for the operation state of the engine 1 from an engine control circuit 15, and obtains a urea water supply quantity for that engine operation state, and obtains a lower limit of a urea water supply quantity at which the interior of the injection nozzle 5 will be cooled to below the temperature at which the urea water crystallizes, for that exhaust gas temperature, and compares both of these and sets the urea water supply quantity. It comprises for example a micro computer (MPU) for controlling, and sends control signals to the booster pump 10, the supply valve 11, and the air supply valve 13 in accordance with that set urea water supply quantity, to thereby control the supply quantity of urea water and compressed air to the injection nozzle 5.

Furthermore, the engine control circuit 15 receives detection signals from a temperature sensor that detects the exhaust gas temperature of the exhaust manifold 2 shown in FIG. 1 (engine exhaust gas temperature), a NOx sensor (not shown in the drawings), an intake air flow sensor, a rotational speed sensor, a load sensor, and so forth, to control the operation state of the engine 1. It comprises for example a micro computer (MPU) for controlling, and sends an operation state signal $S_2$ of the engine 1 such as for the engine exhaust gas temperature, the NOx discharge quantity, and so forth, to the reducing agent supply control circuit 14.

Next, the operation of the exhaust gas purifying apparatus according to the first embodiment constructed in this manner is described with reference to FIG. 2 and FIG. 3. First, in FIG. 1, the exhaust gas due to operation of the engine 1 travels from the exhaust gas manifold 2 through the exhaust pipe 4, and then passes through the NOx reduction catalyst 3 arranged part way along inside of the exhaust pipe 4, and is discharged into the atmosphere from the end outlet of the exhaust pipe 4. At this time, urea water is injected into the exhaust pipe 4 from the injection nozzle 5 arranged on the upstream side of the NOx reduction catalyst 3 in the passage of the exhaust gas. After the urea water has been supplied to the reducing agent supply unit 6 from the urea water reservoir tank 7 through the supply pipe 8, compressed air and urea water are supplied to the injection nozzle 5 by the operation of the reducing agent supply unit 6, and the injection nozzle 5 atomizes the urea water and injection-supplies it.

In this state, in FIG. 2, the exhaust gas temperature inside the exhaust pipe 4 is detected by the exhaust gas temperature sensor 9 arranged in the vicinity of the injection nozzle 5 on exhaust gas upstream side, and that detection signal $S_1$ is sent to the reducing agent supply control circuit 14 of the reducing agent supply unit 6. Moreover the signal $S_2$ for the operation state of the engine 1, such as for the engine exhaust gas temperature, and the NOx discharge quantity, are similarly sent from the engine control circuit 15 to the reducing agent supply control circuit 14.

Figure 3:
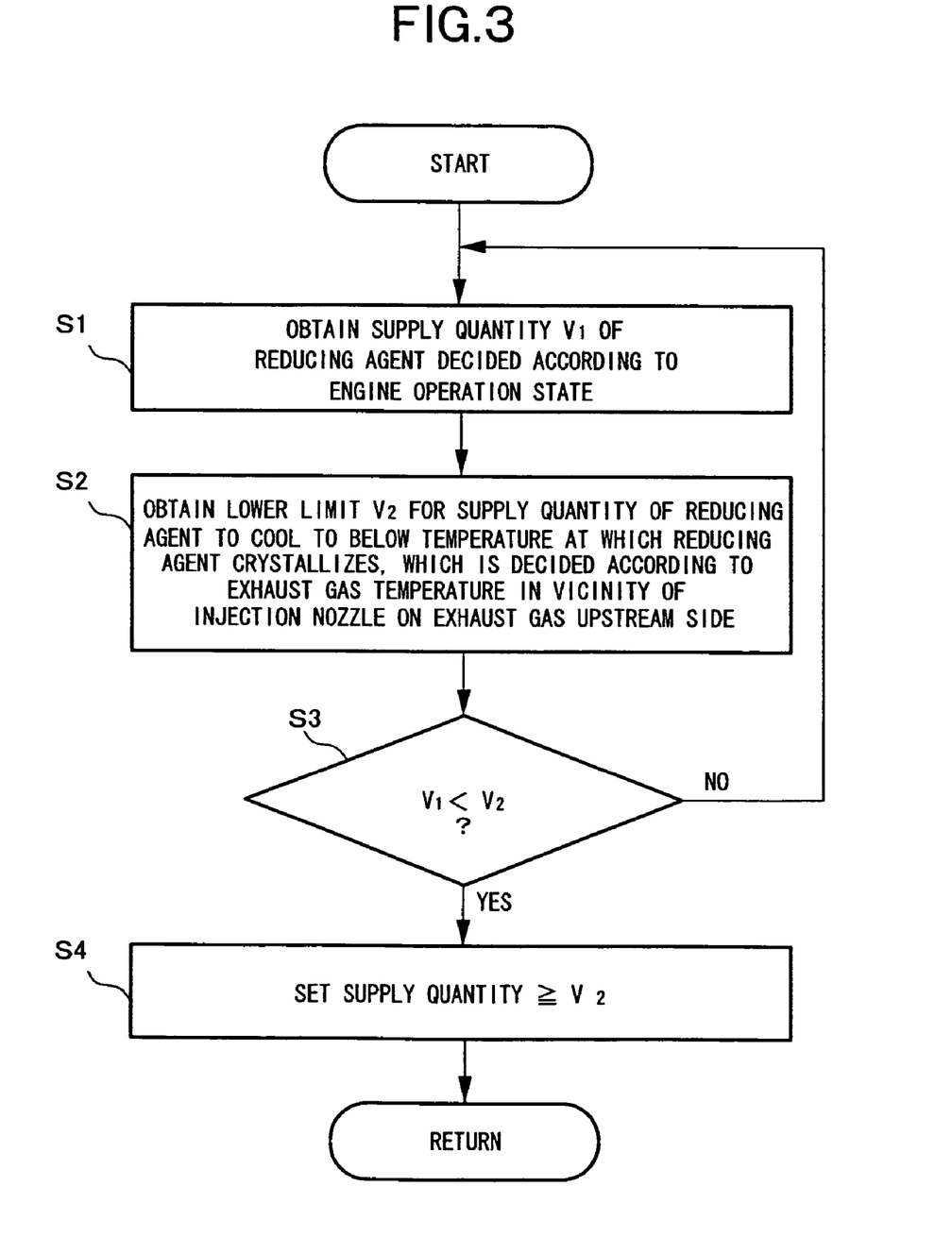
FIG. 3 is a flow chart for explanatorily illustrating the operation of the exhaust gas purifying apparatus.

Then, the reducing agent supply control circuit 14 uses the inputted signal $S_2$ for the operation state of the engine 1 to obtain a supply quantity $V_1$ of the urea water (reducing agent) decided according to the engine operation state (step S1 in FIG. 3). Furthermore, the reducing agent supply control circuit 14 uses the inputted detection signal $S_1$ of the exhaust gas temperature in the exhaust pipe 4 to obtain a lower limit $V_2$ for the supply quantity of urea water (reducing agent) to cool to below the temperature at which urea water crystallizes, which is decided according to the exhaust gas temperature in the vicinity of the injection nozzle 5 on the upstream side in the passage of the exhaust gas (step S2). Then, the urea water supply quantity $V_1$ and the lower limit $V_2$ of that supply quantity obtained above are compared, and it is judged whether or not $V_1$ is smaller than $V_2$ (step S3).

Here if $V_1$ is equal to or greater than $V_2$, then in step S3 control proceeds to the "NO" side, and control returns to step S1, so that the process loops in the order of steps S1→S2→S3. In this case, the urea water supply quantity $V_1$ decided according to the engine operation state at the current time is greater than or equal to the lower limit $V_2$ for a supply quantity for cooling the interior of the nozzle 5 to below the temperature at which urea water crystallizes. Therefore, the currently set supply quantity $V_1$ for the urea water is able to cool the interior of the injection nozzle 5. Consequently, the reducing agent supply control circuit 14 maintains the current openings of the urea water supply valve 11, and the compressed air supply valve 13, and the reducing agent supply unit 6 supplies the urea water to the injection nozzle 5 at the same urea water supply quantity $V_1$.

Next, if $V_1$ is smaller than $V_2$, then in step S3 control proceeds to the "YES" side, and enters step S4. In this case, the urea water supply quantity $V_1$ decided according to the current engine operation state is smaller than the lower limit $V_2$ for a supply quantity for cooling the interior of the nozzle 5 to below the temperature at which the urea water crystallizes. Therefore, the currently set supply quantity $V_1$ for the urea water is unable to cool the interior of the injection nozzle 5. Consequently, the reducing agent supply control circuit 14 changes the current opening of the urea water supply valve 11 and the air supply valve 13 for compressed air to the increased opening side, and the reducing agent supply unit 6 changes the setting of the urea water supply quantity to the lower limit $V_2$ of a supply quantity which cools to below the temperature at which urea water crystallizes (step S4), and supplies urea water to the injection nozzle 5. As a result, the interior of the injection nozzle 5 can be cooled by the urea water supply, the setting of which is changed in step 4, and clogging of the nozzle can be prevented, and the efficiency of the NOx purification processing can be improved.

Subsequently, in order to stop the injection of the urea water from the injection nozzle 5 when the engine 1 stops, the reducing agent supply unit 6 is operated to at first shut off the supply of the urea water from the reservoir tank 7, and to then only supply compressed air to the injection nozzle 5 for a while. As a result, the urea aqueous solution is pushed out from the injection holes of the injection nozzle 5 and the passage leading thereto, and injection of the urea water stops. In this manner, by pushing out the urea water from the injection nozzle, when the supply of urea water to the injection nozzle is stopped there is no residual urea water nor occurrence of so-called "after dribble", and the occurrence of crystallization of the urea water and clogging in the injection holes and inside the passage leading thereto can be prevented.

Figure 4:
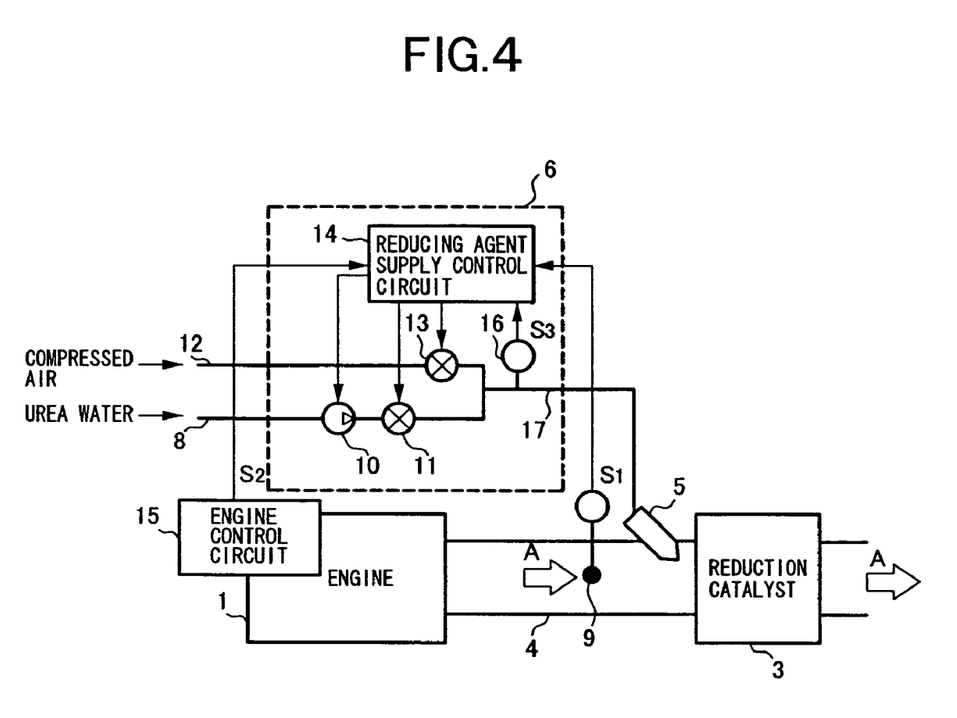
FIG. 4 is a schematic diagram for explanatorily illustrating the construction and operation of a reducing agent supply unit and an injection nozzle of an exhaust gas purifying apparatus according to a second embodiment.

FIG. 4 is a schematic diagram used for describing the construction and operation of a reducing agent supply unit 6 and an injection nozzle 5 of an exhaust gas purifying apparatus according to a second embodiment. This reducing agent supply unit 6 has, in addition to the construction shown in FIG. 2, a pressure sensor 16 for detecting the internal pressure of the injection nozzle 5, and is configured to use a detection signal of the internal pressure of the injection nozzle 5 to stop supply of compressed air and reducing agent to the injection nozzle 5 when the pressure reaches or exceeds a predetermined value, and to use a detection signal of the exhaust gas temperature from an exhaust gas temperature sensor 9 to restart supply of compressed air and reducing agent to the injection nozzle 5 when the exhaust gas temperature in the vicinity of the injection nozzle 5 reaches or exceeds the melting point of the reducing agent.

The above mentioned sensor 16 constitutes a pressure detection unit for detecting the internal pressure of the injection nozzle 5, and is arranged part way along a common pipe 17 that supplies for example compressed air and urea water to the injection nozzle 5, and detects the internal pressure of this common pipe 17 to acquire the internal pressure of the injection nozzle 5.

Moreover, the reducing agent supply unit 6 uses a detection signal $S_3$ of the internal pressure of the injection nozzle 5 detected by the pressure sensor 16 to stop the supply of compressed air and urea water to the injection nozzle 5 when that pressure reaches or exceeds a predetermined value, and uses a detection signal $S_1$ of the exhaust gas temperature from the exhaust gas temperature sensor 9 to restart the supply of compressed air and urea water to the injection nozzle 5 when the exhaust gas temperature in the vicinity of the injection nozzle 5 reaches or exceeds the melting point of solid urea (132° C.).

Furthermore, the reducing agent supply control circuit 14 receives, as an input, the detection signal $S_3$ of the internal pressure of the injection nozzle 5 from the pressure sensor 16, and also receives, as an input, the detection signal $S_1$ of the exhaust gas temperature from the exhaust gas temperature sensor 9, and controls so as to stop the supply of compressed air and urea water to the injection nozzle 5 when the internal pressure of the injection nozzle 5 reaches or exceeds a predetermined value, and restart the supply of compressed air and urea water to the injection nozzle 5 when the exhaust gas temperature in the vicinity of the injection nozzle 5 reaches or exceeds the melting point of solid urea (132° C.). It includes for example a microcomputer (MPU) for control, and sends control signals to the booster pump 10, the supply valve 11, and the air supply valve 13 in accordance with the controlled supply timing so as to control the stop and restart of supply of compressed air and urea water to the injection nozzle 5.

Figure 5:
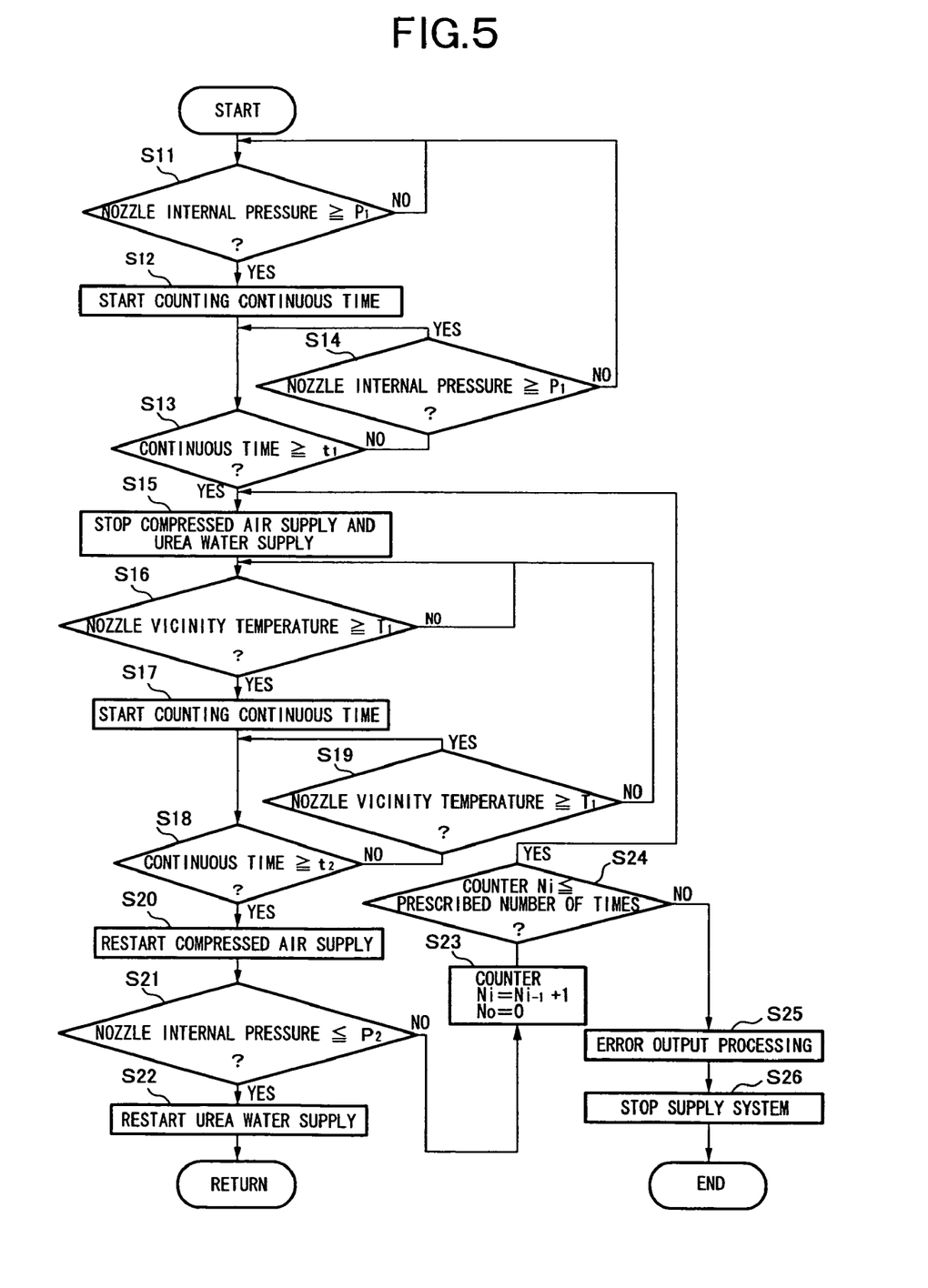
FIG. 5 is a flow chart for explanatorily illustrating the operation of the exhaust gas purifying apparatus.

Next, the operation of the exhaust gas purifying apparatus according to the second embodiment constructed in this manner is described with reference to FIG. 4 and FIG. 5. First, in FIG. 1, the exhaust gas produced by the operation of the engine 1 travels from the exhaust gas manifold 2 through the exhaust pipe 4, and then passes through the NOx reduction catalyst 3 arranged part way along inside of the exhaust pipe 4, and is discharged into the atmosphere from the end outlet of the exhaust pipe 4. At this time, urea water is injected into the exhaust pipe 4 from the injection nozzle 5 arranged on the upstream side of the NOx reduction catalyst 3 in the passage of the exhaust gas. After the urea water has been supplied to the reducing agent supply unit 6 from the urea water reservoir tank 7 through the supply pipe 8, compressed air and urea water are supplied to the injection nozzle 5 by the operation of the reducing agent supply unit 6, and the injection nozzle 5 atomizes the urea water and injection-supplies it.

In this state, in FIG. 4, the exhaust gas temperature inside the exhaust pipe 4 is detected by the exhaust gas temperature sensor 9 arranged in the vicinity of the injection nozzle 5 on the upstream side in the passage of the exhaust gas, and that detection signal $S_1$ is sent to the reducing agent supply control circuit 14 of the reducing agent supply unit 6. Moreover, the internal pressure of the injection nozzle 5 is detected by the pressure sensor 16 arranged part way along the common pipe 17 leading to the injection nozzle 5, and that detection signal $S_3$ is similarly sent to the reducing agent supply control circuit 14.

First, the reducing agent supply control circuit 14 uses the detection signal $S_3$ from the pressure sensor 16 to monitor the internal pressure of the injection nozzle 5 (abbreviated to "nozzle internal pressure" hereinbelow), and judges whether or not it is equal to or higher than a predetermined pressure $P_1$ (step S11 in FIG. 5). In this case, if clogging of the injection nozzle 5 has occurred, the nozzle internal pressure rises due to the supply of compressed air from the air supply pipe 12. Therefore by setting the predetermined pressure $P_1$ as the pressure at the time when clogging is occurring, clogging of the nozzle can be judged by a rise in nozzle internal pressure. Here, in the case where the nozzle internal pressure is below the predetermined pressure $P_1$, it is judged that clogging of the nozzle is not occurring, and in step S11 control proceeds to the "NO" side, and the nozzle pressure is monitored as before.

Thereafter, in the case where the nozzle internal pressure reaches or exceeds the predetermined pressure $P_1$, in step S11 control proceeds to the "YES" side and enters step S12. Here, the time during which the nozzle internal pressure continues to be at or above $P_1$ is counted. Then, it is judged whether or not the continuous time for the state where the pressure is at or above the predetermined pressure $P_1$ has reached or exceeded a predetermined time $t_1$ (step S13). This is in order to improve the reliability of the device by eliminating error or malfunction of the pressure sensor 16, by determining that nozzle clogging has only just occurred when the state where the nozzle internal pressure is at or above the predetermined pressure $P_1$ has continued for at least a value set as the predetermined time $t_1$. Here, in the case where the continued time is less than the predetermined time $t_1$, it is judged that clogging of the nozzle has not occurred, and in step S13 control proceeds to the "NO" side and enters step S14. Then, it is again judged whether or not the nozzle internal pressure has reached or exceeded the predetermined pressure $P_1$, and control proceeds to the "YES" side and the continued time is monitored.

Thereafter, in the case where the continued time reaches or exceeds the predetermined time $t_1$, it is judged that clogging of the injection nozzle 5 has occurred, and in step S13 control proceeds to the "YES" side and enters step S15. Here the air supply valve 13 and the supply valve 11 shown in FIG. 4 are shut, and the compressed air supply and the urea water supply to the injection nozzle 5 are stopped. As a result, the cooling of the interior of the injection nozzle 5 by the compressed air and the urea water is suppressed, and this is heated by the exhaust gas flowing in the exhaust pipe 4 to thereby promote the melting of the solid urea that has solidified in the nozzle interior.

Moreover, using the detection signal $S_1$ from the exhaust gas temperature sensor 9 shown in FIG. 4, the exhaust gas temperature in the vicinity of the injection nozzle 5 (abbreviated to "nozzle vicinity temperature") is monitored, and it is judged whether or not it has reached or exceeded a predetermined temperature $T_1$ (step S16). In this case, since the melting point of solid urea is 132° C., by setting $T_1$ at or above 132° C., the solid urea inside the injection nozzle 5 can be made to melt. Here, in the case where the nozzle vicinity temperature is below the predetermined temperature $T_1$, it is judged that the solid urea has not been melted, and in step S16 control proceeds to the "NO" side, and the nozzle vicinity temperature is monitored as before.

Thereafter, in the case where the nozzle vicinity temperature reaches or exceeds the predetermined temperature $T_1$, in step S16 control proceeds to the "YES" side and enters step S17. Here, the time during which the state of the nozzle vicinity temperature being at or above the predetermined temperature $T_1$ continues is counted. Then, it is judged whether or not the continuous time in the state of being above the predetermined temperature $T_1$, has reached or exceeded a predetermined time $t_2$ (step S18). This is in order to improve the reliability of the device by eliminating error or malfunction of the temperature sensor 9, by determining that the solid urea has only just melted when the state where the nozzle vicinity temperature is at or above the predetermined temperature $T_1$ has continued for at least a value set as the predetermined time $t_2$. Here, in the case where the continued time is less than the predetermined time $t_2$, it is judged that the solid urea has not melted, and in step S18 control proceeds to the "NO" side and enters step S19. Then, it is again judged whether or not the nozzle vicinity temperature has reached or exceeded the predetermined temperature $T_1$, and control proceeds to the "YES" side and the continued time is monitored.

Thereafter, in the case where the continued time reaches or exceeds the predetermined time $t_2$, it is judged that the solid urea inside the injection nozzle has melted, and in step S18 control proceeds to the "YES" side and enters step S20. Here the air supply valve 13 shown in FIG. 4 is opened, and the supply of compressed air to the injection nozzle 5 is restarted.

Then, it is judged whether or not the nozzle internal pressure is at or below another predetermined pressure $P_2$ (step S21). In this case, if the solid urea inside the injection nozzle 5 has melted, then even if compressed air is supplied from the air supply pipe 12, the nozzle internal pressure will not rise above a given pressure. Therefore, by setting the above mentioned predetermined pressure $P_2$ at the nozzle internal pressure for the state where clogging is not occurring, clearance of nozzle clogging can be judged by the drop in nozzle internal pressure. Here in the case where the nozzle internal pressure has reached or gone below the predetermined pressure $P_2$, it is judged that the nozzle clogging has been cleared by melting the solid urea, and in step S21 control proceeds to the "YES" side, and enters step S22. Here the supply valve 11 shown in FIG. 4 is opened, and the supply of urea water to the injection nozzle 5 is restarted. As a result, the injection nozzle 5 is recovered to a normal state in which there is no nozzle clogging.

On the other hand, in the case where the nozzle internal pressure is higher than the other predetermined pressure $P_2$, it is judged that the solid urea has not yet melted and the nozzle clogging has not been cleared, and in step S21 control proceeds to the "NO" side, and in step 23 a counter for number of repetitions Ni is incremented by "1", and in step S24 it is judged whether the number of repetitions Ni is within a predetermined prescribed number of times, and control returns to step S15. Then, the supply of compressed air as well as the supply of urea water to the injection nozzle 5 is again stopped, and each of the above steps is repeated so that the operation of clearing the nozzle clogging is carried out the prescribed number of times only.

At this time, in the case where the number of repetitions Ni in step S24 exceeds the prescribed number of times, control proceeds to the "NO" side, and error output processing is performed (step S25), and the urea water supply system is stopped (step S26), and the operation is ended. As a result, the supply of compressed air and the supply of urea water to the injection nozzle 5 are stopped, and cooling of the interior of the nozzle is suppressed, and the injection nozzle 5 is heated by the exhaust gas flowing in the exhaust pipe 4, so that the solid urea that has solidified inside the nozzle can be melted and the nozzle clogging can be cleared. Consequently even if the exhaust gas temperature inside the exhaust pipe 4 is low, clogging of the injection nozzle 5 can be cleared, and the efficiency of the NOx purification processing is improved.

Subsequently, in order to stop the injection of the urea water from the injection nozzle 5 when the engine 1 stops, the reducing agent supply unit 6 is operated to at first shut off the supply of the urea water from the reservoir tank 7, and to then only supply compressed air to the injection nozzle 5 for a while. As a result, the urea water is pushed out from the injection holes of the injection nozzle 5 and the passage leading thereto, and injection of the urea water stops. In this manner, by pushing out the urea water from the injection nozzle, there is no residual urea water nor the occurrence of so-called "after dribble" when the supply of urea water to the injection nozzle is stopped, and the occurrence of crystallization of the urea water and clogging in the injection holes and inside the passage leading thereto can be prevented.

In FIG. 4, the pressure sensor 16 inside the reducing agent supply unit 6 is arranged part way along the common pipe 17 that supplies compressed air and urea water to the injection nozzle 5, but the present invention is not limited to this, and it may be arranged in the interior of the injection nozzle 5, and directly detect the internal pressure of the injection nozzle 5.

I claim:

1. An exhaust gas purifying apparatus for an engine comprising:
    a reduction catalyst which is arranged in an exhaust system of the engine, for reducing and purifying nitrogen oxide in an exhaust gas using a reducing agent;
    reducing agent supply means having an injection nozzle which is supplied with a reducing agent together with compressed air and atomizes said reducing agent, and which injection-supplies this to an exhaust gas on an upstream side of said reduction catalyst inside an exhaust gas passage of said exhaust system; and
    temperature detection means which is provided in the vicinity of said injection nozzle on the upstream side in the exhaust gas passage, and which detects the exhaust gas temperature inside said exhaust gas passage; wherein
    said reducing agent supply means uses a detection signal of the exhaust gas temperature from said temperature detection means to set, for that exhaust gas temperature, a supply quantity of reducing agent and compressed air at or above a lower limit for cooling the interior of said injection nozzle to below a temperature at which the reducing agent crystallizes, and supplies reducing agent and compressed air to said injection nozzle.

2. The exhaust gas purifying apparatus for an engine according to claim 1, wherein said reducing agent supply means is provided with a control circuit which receives, as an input, a detection signal of the exhaust gas temperature from said temperature detection means, and also receives, as an input, a signal of the operation state of the engine, and which obtains a supply quantity of reducing agent in that engine operation state, and obtains, for that exhaust gas temperature, a lower limit of a supply quantity of reducing agent for cooling the interior of said injection nozzle to below the temperature at which the reducing agent crystallizes, and compares both of these obtained supply quantities to set the supply quantity of the reducing agent and compressed air.

3. The exhaust gas purifying apparatus for an engine according to either one of claim 1 and claim 2, wherein said reducing agent is a urea aqueous solution.

4. An exhaust gas purifying apparatus for an engine comprising:
   a reduction catalyst which is arranged in an exhaust system of an engine, for reducing and purifying nitrogen oxide in an exhaust gas using a reducing agent;
   reducing agent supply means having an injection nozzle which is supplied with a reducing agent together with compressed air and atomizes said reducing agent, and which injection-supplies this to an exhaust gas on an upstream side of said reduction catalyst inside an exhaust gas passage of said exhaust system; and
   temperature detection means which is provided in the vicinity of said injection nozzle on the upstream side of the exhaust gas passage, and which detects the exhaust gas temperature inside said exhaust gas passage; wherein
   said reducing agent supply means is provided with pressure detection means for detecting an internal pressure of said injection nozzle, and uses a detection signal of the internal pressure of said injection nozzle to stop supply of compressed air and reducing agent to the injection nozzle when the internal pressure reaches or exceeds a predetermined value, and uses a detection signal of the exhaust gas temperature from said temperature detection means to restart supply of compressed air and reducing agent to the injection nozzle when the exhaust gas temperature in the vicinity of the injection nozzle reaches or exceeds the melting point of the reducing agent.

5. The exhaust gas purifying apparatus for an engine according to claim 4, wherein said reducing agent supply means is provided with a control circuit which receives, as an input, a detection signal of internal pressure of the injection nozzle from said pressure detection means, and also receives, as an input, a detection signal of the exhaust gas temperature from said temperature detection means, and controls so as to stop the supply of compressed air and reducing agent to the injection nozzle when the internal pressure of the injection nozzle reaches or exceeds a predetermined value, and restart supply of compressed air and reducing agent to the injection nozzle when the exhaust gas temperature in the vicinity of the injection nozzle reaches or exceeds the melting point of the reducing agent.

6. The exhaust gas purifying apparatus for an engine according to either one of claim 4 and claim 5, wherein said reducing agent is a urea aqueous solution.

7. The exhaust gas purifying apparatus for an engine according to claim 6, wherein an exhaust gas temperature in the vicinity of the injection nozzle at the time when the supply of compressed air and reducing agent to said injection nozzle is restarted is set to be 132° C. or thereabove.

8. An exhaust gas purifying apparatus for an engine comprising:
   a reduction catalyst which is arranged in an exhaust system of the engine, for reducing and purifying nitrogen oxide in an exhaust gas using a reducing agent;
   a reducing agent supply device having an injection nozzle which is supplied with said reducing agent together with compressed air and atomizes said reducing agent, and which injection-supplies said reducing agent and compressed air to an exhaust gas on an upstream side of said reduction catalyst inside an exhaust gas passage of said exhaust system; and
   a temperature sensor which is provided in the vicinity of said injection nozzle on the upstream side in the exhaust gas passage, and which detects the exhaust gas temperature inside said exhaust gas passage,
   wherein said reducing agent supply device uses a detection signal of the exhaust gas temperature sensor to set, for that exhaust gas temperature, a supply quantity of reducing agent and compressed air at or above a lower limit for cooling the interior of said injection nozzle to below a temperature at which the reducing agent crystallizes, and supplies reducing agent and compressed air to said injection nozzle.

9. An exhaust gas purifying apparatus for an engine comprising:
   a reduction catalyst which is arranged in an exhaust system of an engine, for reducing and purifying nitrogen oxide in an exhaust gas using a reducing agent;
   a reducing agent supply device having an injection nozzle which is supplied with said reducing agent together with compressed air and atomizes said reducing agent, and which injection-supplies said reducing agent and compressed air to an exhaust gas on an upstream side of said reduction catalyst inside an exhaust gas passage of said exhaust system; and
   a temperature sensor which is provided in the vicinity of said injection nozzle on the upstream side of the exhaust gas passage, and which detects the exhaust gas temperature inside said exhaust gas passage,
   wherein said reducing agent supply device is provided with pressure sensor for detecting an internal pressure of said injection nozzle, and uses a detection signal of the internal pressure of said injection nozzle to stop supply of compressed air and reducing agent to the injection nozzle when the internal pressure reaches or exceeds a predetermined value, and uses a detection signal of the exhaust gas temperature from said temperature sensor to restart supply of compressed air and reducing agent to the injection nozzle when the exhaust gas temperature in the vicinity of the injection nozzle reaches or exceeds the melting point of the reducing agent.

\* \* \* \* \*